(12) United States Patent
François et al.

(10) Patent No.: US 11,258,168 B2
(45) Date of Patent: Feb. 22, 2022

(54) ANTENNA ARRANGEMENT, EXTERNAL WATCH PART COMPRISING SUCH AN ANTENNA ARRANGEMENT AND METHOD FOR MANUFACTURING SUCH AN EXTERNAL WATCH PART

(71) Applicant: The Swatch Group Research and Development Ltd, Marin (CH)

(72) Inventors: Nicolas François, Neuchâtel (CH); Zoran Randjelovic, Corcelles (CH); Thierry Scordilis, Cormondrèche (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/846,678

(22) Filed: Apr. 13, 2020

(65) Prior Publication Data

US 2020/0395656 A1    Dec. 17, 2020

(30) Foreign Application Priority Data

Jun. 12, 2019  (EP) .................................... 19179728

(51) Int. Cl.
*H01Q 1/36*  (2006.01)
*H01Q 1/27*  (2006.01)
*H01Q 1/40*  (2006.01)
*H01Q 1/44*  (2006.01)

(52) U.S. Cl.
CPC .............. *H01Q 1/36* (2013.01); *H01Q 1/273* (2013.01); *H01Q 1/40* (2013.01); *H01Q 1/44* (2013.01)

(58) Field of Classification Search
CPC ........ G04G 21/04; G04R 60/04; G04R 60/06; H01Q 1/273; H01Q 1/36; H01Q 1/40; H01Q 1/44; H04B 5/0062; H04B 5/0075
See application file for complete search history.

(56) References Cited

U.S. PATENT DOCUMENTS

| 4,769,656 A | 9/1988 | Dickey |
| 2005/0249050 A1 | 11/2005 | Apotheloz et al. |
| 2007/0251207 A1* | 11/2007 | Stobbe .................. G06K 19/02 57/218 |

(Continued)

FOREIGN PATENT DOCUMENTS

| CN | 1755984 A | 4/2006 |
| CN | 204720550 U | 10/2015 |

(Continued)

OTHER PUBLICATIONS

Kashif Nisar Paracha et al., "Wearable Antennas: A Review of Materials, Structures, and Innovative Features for Autonomous Communication and Sensing", IEEE Access, 2019, pp. 56694-56712, vol. 7.

(Continued)

*Primary Examiner* — Thien M Le
(74) *Attorney, Agent, or Firm* — Sughrue Mion, PLLC

(57) ABSTRACT

An antenna arrangement (6) for an external watch part (2) of a timepiece. The antenna arrangement is formed of a technical embroidery, which includes an embroidered structure of insulating wires or natural fibres (10) and at least one conductive wire (12) embroidered so as to produce a fine (Continued)

coil integrated in the embroidered structure of insulating wires or natural fibres. The conductive wire is connected to a radiofrequency integrated circuit (8).

16 Claims, 1 Drawing Sheet

(56) References Cited

U.S. PATENT DOCUMENTS

| | | | | |
|---|---|---|---|---|
| 2008/0003764 | A1* | 1/2008 | Seh | H05K 1/162 |
| | | | | 438/393 |
| 2010/0199903 | A1 | 8/2010 | Deaett et al. | |
| 2011/0056021 | A1* | 3/2011 | James | A47G 9/0207 |
| | | | | 5/502 |
| 2014/0209690 | A1* | 7/2014 | Teng | G06K 19/027 |
| | | | | 235/492 |
| 2015/0362635 | A1* | 12/2015 | Toriyama | G02B 3/0031 |
| | | | | 438/29 |
| 2017/0018843 | A1* | 1/2017 | Kourti | H01Q 9/26 |
| 2017/0179580 | A1 | 6/2017 | Park et al. | |
| 2018/0123246 | A1* | 5/2018 | Wu | H04B 5/0081 |
| 2020/0170514 | A1* | 6/2020 | Hui | A61B 5/0507 |

FOREIGN PATENT DOCUMENTS

| | | |
|---|---|---|
| CN | 108027589 A | 5/2018 |
| CN | 108702403 A | 10/2018 |
| CN | 109076114 A | 12/2018 |
| FR | 3033214 A1 | 9/2016 |
| JP | 63197103 A | 8/1988 |
| JP | 2005538367 A | 12/2005 |
| JP | 2006-309401 A | 11/2006 |
| JP | 2019066401 A | 4/2019 |
| WO | 2017/111385 A1 | 6/2017 |

OTHER PUBLICATIONS

European Search Report for EP 19 17 9728 dated Nov. 5, 2019.
Communication dated Mar. 1, 2021, from the China National Intellectual Property Administration in application No. 202010535193.6.
Communication dated May 25, 2021, from the Japanese Patent Office in application No. 2020-080184.

* cited by examiner

ANTENNA ARRANGEMENT, EXTERNAL WATCH PART COMPRISING SUCH AN ANTENNA ARRANGEMENT AND METHOD FOR MANUFACTURING SUCH AN EXTERNAL WATCH PART

CROSS REFERENCE TO RELATED APPLICATIONS

This application claims priority to European Patent Application No. 19179728.1 filed Jun. 12, 2019, the entire contents of which are incorporated herein by reference.

TECHNICAL FIELD OF THE INVENTION

The invention relates to an antenna arrangement for an external watch part. Such an antenna arrangement can for example allow a bidirectional data communication with other connected electronic objects.

The invention relates likewise to an external watch part comprising such an antenna arrangement and also a method for manufacturing such an external watch part. The external watch part is for example a watch bezel, a watch strap, a watch dial, or even a watch case middle.

The invention relates finally to a timepiece comprising such an external watch part. The timepiece is for example a watch.

STATE OF THE ART

It is known to provide a timepiece, for example a watch, with an antenna connected to an integrated transmission and/or reception circuit. Such an antenna offers thus the timepiece new functionalities allowing communication with its environment. The antenna is in that case typically formed by a solid mono-bloc mass, which is an electrical conductor. Such an antenna arrangement for a watch is for example described in patent EP 1 378 805 B1. The antenna has in that case the form of a ring disposed at the periphery of the middle part of the watch, and the integrated transmission and/or reception circuit is housed in the middle part. The solid mono-bloc mass, forming the antenna, therefore forms at the same time the bezel of the watch.

However, a disadvantage of the antenna arrangement proposed in patent EP 1 378 805 B1 is that it is particularly vulnerable to outside influences, such as for example moisture, mechanical impacts, temperature conditions. Furthermore, this antenna arrangement imposes design modifications upon the parts of the watch, which may impair its aesthetics. Furthermore, the connection with the integrated circuit makes it necessary to pierce the middle part, which makes assembly of the entirety complex. Such an antenna arrangement thus impairs the reliability of the watch.

Other timepiece embodiments comprise an antenna inside the watch case. However, in such embodiments where the antenna is formed of a mono-bloc material, the antenna requires space inside the case because it has a relatively large spatial requirement. This plays a part in increasing the weight of the external watch part, whilst making the construction of the movement more complex.

SUMMARY OF THE INVENTION

The aim of the invention is therefore to provide an antenna arrangement for an external watch part, which is able to be installed inside the part in order to keep it safe from outside influences, whilst being simple to install and not very bulky, and allowing a reliable communication of data with connected electronic objects.

To this end, the invention relates to an antenna arrangement for an external watch part, which comprises the features mentioned in the independent claim 1.

A particular form of the antenna arrangement is defined in the dependent claims 2 and 3.

Thanks to the technical embroidery, which forms the antenna arrangement according to the invention, this arrangement can be easily installed within an external watch part. Such a technical embroidery, which is a form developed in two-dimensions for the timepiece and which comprises an embroidered structure of insulating wires or natural fibres and at least one conductive wire embroidered within a fine winding, is in fact in particular not very bulky whilst offering operating reliability for the antenna formed from the conductive wire. Furthermore, such technical embroidery lends itself particularly well to producing external watch parts in a composite material, in particular in a material combining the technical embroidery and a solidified resin, which can be typically a thermosetting resin or an elastomeric resin.

To this end, the invention relates likewise to a method of manufacturing an external watch part comprising the antenna arrangement described above, and which comprises the features mentioned in the independent claim 4.

Particular forms of the method are defined in the dependent claims 5 and 6.

To this end, the invention relates likewise to an external watch part comprising the antenna arrangement described above, and which comprises the features mentioned in the independent claim 7.

Particular forms of the external watch part are defined in the dependent claims 8 to 13.

According to a particular technical feature of the invention, the external watch part is formed of a flexible structure, in particular a structure made of fabric.

Advantageously, the external watch part is formed of a composite structure comprising the technical embroidery and a solidified resin, and enclosing the radiofrequency integrated circuit. Such a composite structure makes it possible to obtain an external watch part, which is particularly strong and light. Furthermore, the use of such a composite structure makes it possible to obtain a material, which does not form a screen relative to the magnetic and electrical fields of the antenna.

To this end, the invention relates likewise to a timepiece comprising the external watch part described above, and which comprises the features mentioned in the independent claim 14.

BRIEF DESCRIPTION OF THE FIGURES

The aims, advantages and features of the antenna arrangement for an external watch part according to the invention will appear better in the following description based on at least one embodiment, which is non-limiting and illustrated by the drawings in which.

DETAILED DESCRIPTION OF THE INVENTION

Figure 1:
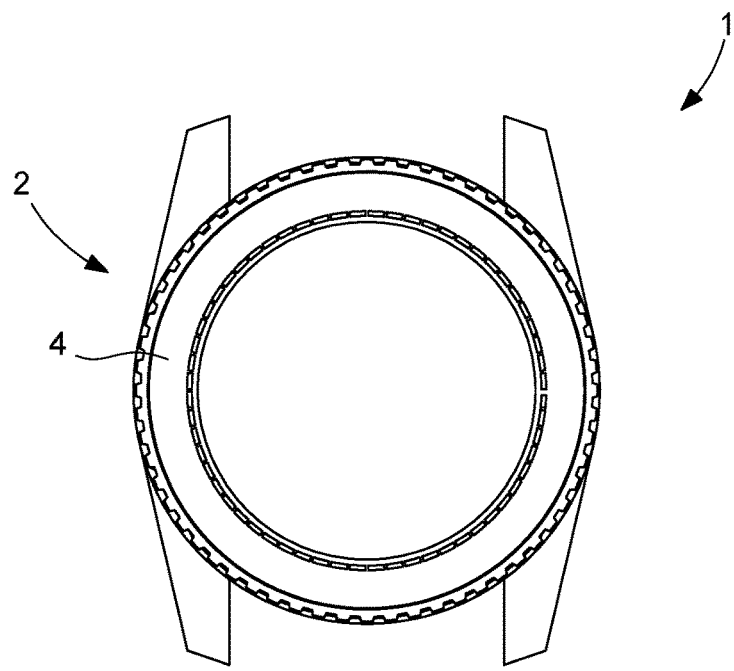
FIG. 1 is a perspective view of a watch comprising an annular bezel, the annular bezel being provided with an antenna arrangement according to the invention.

FIG. 1 represents a watch 1 provided with an annular bezel 2. The annular bezel is mounted on a middle part of the watch, represented in summary in the Figures for reasons of clarity.

Figure 2:
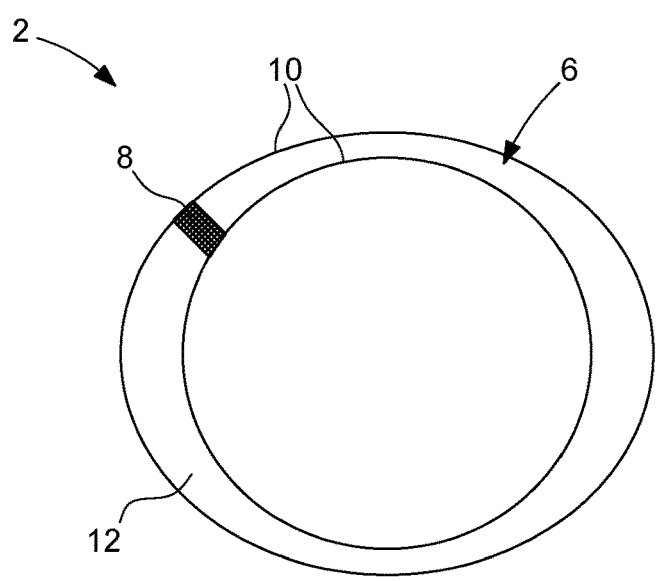
FIG. 2 is a schematic view of the inside of the bezel of FIG. 1, according to a particular embodiment of the antenna arrangement according to the invention.

The annular bezel 2 is formed of a composite structure comprising a solidified resin 4. As illustrated in FIG. 2, the composite structure comprises in addition a technical embroidery 6, and encloses a radiofrequency integrated circuit 8 for transmission and/or reception. In the particular embodiment example illustrated in FIG. 1, the solidified resin 4 is a thermosetting resin. The resin 4 is for example a plastic material resin. In a non-represented variant, the solidified resin 4 is an elastomeric resin. The resin 4 is for example rubber.

The technical embroidery 6 forms an antenna arrangement. The technical embroidery 6 comprises an embroidered structure of insulating wires or natural fibres 10 and at least one conductive wire 12 embroidered so as to produce a fine winding integrated in the embroidered structure of insulating wires or natural fibres 10. In the particular embodiment example illustrated in FIG. 2, the technical embroidery 6 comprises a single conductive wire 12. The conductive wire 12, which forms the antenna per se, is connected to the radiofrequency integrated circuit 8. In a non-represented variant, the technical embroidery 6 comprises a plurality of conductive wires 12. In this case, the conductive wires 12 form for example a coil of several turns, each of the conductive wires 12 being connected to the radiofrequency integrated circuit 8. Such an embodiment variant is in particular advantageous in the case where the radiofrequency integrated circuit 8 is an NFC near field communication chip, for example in order to increase the inductance of the antenna so as to adapt in frequency the integrated circuit 8 by acting on the number of turns.

The conductive wires 12 can be made of metal or of carbon or of modified silicone for example.

Preferably, the insulating wires 10 have an electrical resistance, which can be for example greater than $10^8$ Ohm·m. In the particular embodiment illustrated in FIG. 2, the insulating wires 10 are glass fibres. In a non-represented variant, the insulating wires 10 can be synthetic wires, such as for example wires made of polyamide or of polyester, or even ceramic fibres.

In a variant of the embroidered structure, the natural fibres 10 can be formed for example of flax or of hemp or of cotton or of a combination of these components.

The radiofrequency integrated circuit 8 is for example a contactless communication chip. In the particular embodiment of FIG. 2, the radiofrequency integrated circuit 8 is an RFID radio-identification chip (from the English Radio Frequency Identification). In a non-represented variant, the radiofrequency integrated circuit 8 is an NFC near field communication chip or to effect transactions or bank payments.

Figure 3:
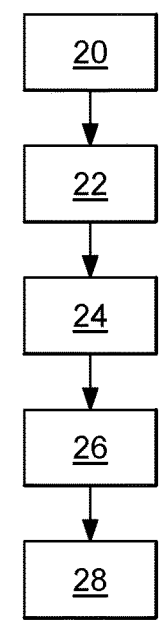
FIG. 3 is a flow chart representing the steps of a method for manufacturing an external watch part according to the invention.

A method of manufacturing an external watch part comprising the antenna arrangement 6 according to the invention will now be described with reference to FIG. 3. The external watch part is for example the annular bezel 2 illustrated in FIGS. 1 and 2. In a non-represented variant, the external watch part can be a watch strap, a watch dial or even a watch case middle.

The method comprises an initial step 20 in the course of which the technical embroidery 6 is adjusted in a mould of the external watch part to be produced. In the course of this initial step, the or each conductive wire 12 of the technical embroidery 6 is connected to the radiofrequency integrated circuit 8, which was previously inserted into the mould.

In the course of a following step 22, a resin 4 is injected into the mould in order to impregnate the technical embroidery 6 and the radiofrequency integrated circuit 8.

In the course of a following step 24, the resin 4 contained in the mould is cured. When the resin 4 is a thermosetting resin, as in the embodiment example of FIG. 1, the curing temperature is preferably between 200° C. and 250° C. When the resin 4 is an elastomeric resin, the curing temperature is preferably substantially equal to 300° C.

In the course of a following step 26, the resin 4 contained in the mould is crosslinked.

In the course of a final step 28, the entirety formed of the technical embroidery 6, the radiofrequency integrated circuit 8 and the crosslinked resin 4 is removed from the mould. Hence the external watch part according to a particular embodiment of the invention is obtained.

Although the invention has been described with reference to an external watch part, in this case, an annular bezel 2, formed of a composite structure comprising a solidified resin 4, other embodiment variants are possible for the external watch part without departing from the scope of the invention. In particular, the external watch part can be formed of a flexible structure, in particular a structure made of fabric. In this case, the external watch part is typically a watch strap, and no longer comprises solidified resin. According to another embodiment variant, the external watch part is formed from a ceramic base. The external watch part, which is typically a watch bezel, comprises for example a hollow ring made of ceramic, inside which the antenna arrangement 6 and the integrated circuit 8 are received. A rubber ring comes therefore to close the hollow ceramic ring, making it possible to obtain the watch bezel.

What is claimed is:

1. An apparatus comprising:
   an external watch part that comprises:
   an antenna arrangement formed of a technical embroidery, which technical embroidery comprises an embroidered structure of insulating wires or natural fibres and at least one conductive wire embroidered so as to produce a fine integrated coil in said embroidered structure of insulating wires or natural fibres.

2. The antenna arrangement according to claim 1, wherein the insulating wires are chosen from a group consisting of glass fibres, synthetic wires, and ceramic fibres.

3. The antenna arrangement according to claim 1, wherein the natural fibres are formed of flax, of hemp, or of cotton, or of a combination of these components.

4. The apparatus according to claim 1, wherein the external watch part further comprises a radiofrequency integrated circuit, and the at least one conductive wire is connected to the radiofrequency integrated circuit.

5. The apparatus according to claim 4, wherein the radiofrequency integrated circuit is a contactless communication chip, in particular an RFID radio-identification chip or an NFC near field communication chip.

6. The apparatus according to claim 4, wherein the radiofrequency integrated circuit is a near field communication chip NFC for effecting transactions or bank payments.

7. The apparatus according to claim 4, wherein the external watch part is formed of a flexible structure, in particular, a structure made of fabric.

8. The apparatus according to claim 7, wherein the external watch part is a watch strap.

9. The apparatus according to claim 4, wherein the external watch part is formed of a composite structure comprising the technical embroidery and a solidified resin, and enclosing the radiofrequency integrated circuit.

10. The external watch part according to claim 9, wherein the external watch part is a part chosen from a group consisting of a watch bezel, a watch strap, a watch dial, and a watch case middle.

11. A timepiece comprising the apparatus according to claim 4.

12. The apparatus according to claim 1, wherein the external watch part is a watch bezel, a watch dial, or a watch case middle.

13. The apparatus according to claim 1, wherein the external watch part is a watch bezel, and the at least one conductive wire of the embroidered structure extends along an annular shape of the watch bezel.

14. A method for manufacturing an external watch part comprising an antenna arrangement formed of a technical embroidery, which technical embroidery comprises an embroidered structure of insulating wires or natural fibres and at least one conductive wire embroidered so as to produce a fine coil integrated in said embroidered structure of insulating wires or natural fibres, the method comprising the following steps:

adjusting the technical embroidery in a mould of the external watch part to be produced, and connecting said at least one conductive wire to a radiofrequency integrated circuit inserted in the mould;

injecting a resin into the mould so as to impregnate the technical embroidery and the radiofrequency integrated circuit;

curing the resin contained in the mould;

crosslinking the resin contained in the mould; and removing an assembly formed of the technical embroidery, the radiofrequency integrated circuit and the crosslinked resin from the mould.

15. The method according to claim 14, wherein the resin is a thermosetting resin, and wherein, during the step of curing the resin, the curing temperature is between 200° C. and 250° C.

16. The method according to claim 14, wherein the resin is an elastomeric resin, and wherein, during step of curing the resin, the curing temperature is substantially equal to 300° C.

* * * * *